United States Patent [19]

Biscomb

[11] Patent Number: 4,527,950
[45] Date of Patent: Jul. 9, 1985

[54] WIND MOTOR

[76] Inventor: Lloyd I. Biscomb, 4452 Burlington Pl., NW., Washington, D.C. 20016

[21] Appl. No.: 521,573

[22] Filed: Aug. 9, 1983

[51] Int. Cl.³ .............................................. F03D 3/06
[52] U.S. Cl. .................................... 416/117; 416/119; 416/132 B
[58] Field of Search ..................... 416/117, 119, 132 B, 416/DIG. 6

[56] References Cited

U.S. PATENT DOCUMENTS

| 177,057 | 5/1876 | Bowes | 416/119 |
|---|---|---|---|
| 580,761 | 4/1897 | Bratka | 416/117 |
| 619,005 | 2/1899 | Whidden | 416/117 |
| 720,750 | 2/1903 | Speegle | 416/117 |
| 925,063 | 6/1909 | White | 416/117 |
| 1,075,060 | 10/1913 | O'Toole | 416/17 |
| 1,201,184 | 10/1916 | Holben | 416/119 |
| 1,313,621 | 8/1919 | Dammann | 415/2 R |
| 1,518,022 | 12/1924 | Twifford | 416/119 |
| 1,562,506 | 4/1924 | Jenkins | 415/2 R |
| 1,697,574 | 1/1929 | Savonius | 416/4 |
| 1,753,302 | 4/1930 | Ramm | 416/117 |
| 1,791,731 | 2/1931 | Madarasz | 416/4 |
| 1,835,018 | 12/1931 | Darrieus | 416/119 |
| 1,915,689 | 6/1933 | Moore | 416/117 |
| 1,917,655 | 7/1933 | Leash | 416/23 X |
| 1,953,444 | 4/1934 | Stalker | 416/13 |
| 2,082,966 | 6/1937 | Madarasz | 416/4 |
| 2,085,411 | 6/1937 | Biehn | 416/117 |
| 2,603,300 | 7/1952 | King | 416/17 |
| 3,565,546 | 2/1971 | Shanahan | 416/119 |
| 3,877,836 | 4/1975 | Tompkins | 416/119 |
| 3,902,072 | 8/1975 | Quinn | 290/44 |
| 4,032,257 | 6/1977 | deHaas | 416/117 |
| 4,047,833 | 9/1977 | Decker | 415/2 |
| 4,134,710 | 1/1979 | Atherton | 416/117 |
| 4,142,832 | 3/1979 | Clifton | 416/117 |
| 4,168,439 | 9/1979 | Palma | 290/44 |
| 4,178,126 | 12/1979 | Weed | 416/17 |
| 4,191,507 | 3/1980 | DeBerg | 416/117 |
| 4,203,707 | 5/1980 | Stepp | 416/119 |
| 4,218,183 | 8/1980 | Dall-Winther | 416/41 |
| 4,247,252 | 1/1981 | Seki et al. | 416/44 |
| 4,247,253 | 1/1981 | Seki et al. | 416/44 |
| 4,248,568 | 2/1981 | Lechner | 416/132 B |
| 4,264,279 | 4/1981 | Dereng | 416/227 A |
| 4,285,636 | 8/1981 | Kato | 416/197 A |
| 4,286,922 | 9/1981 | Lew | 416/17 |
| 4,299,537 | 10/1981 | Evans | 416/119 |
| 4,303,835 | 12/1981 | Bair | 290/55 |
| 4,334,823 | 7/1982 | Sharp | 416/119 |
| 4,341,176 | 7/1982 | Orrison | 416/119 X |
| 4,355,956 | 10/1982 | Ringrose et al. | 416/132 B |
| 4,383,801 | 5/1983 | Pryor | 416/17 |
| 4,408,956 | 10/1983 | Price | 416/119 |

FOREIGN PATENT DOCUMENTS

| 3028803 | 3/1982 | Fed. Rep. of Germany | 416/117 |
|---|---|---|---|
| 386964 | 6/1908 | France | 416/119 |
| 1021281 | 2/1953 | France | 416/117 |
| 2300910 | 9/1976 | France | 416/119 |
| 2312666 | 12/1976 | France | 415/2 |
| 185491 | 9/1922 | United Kingdom | 416/119 |

Primary Examiner—Everette A. Powell, Jr.
Attorney, Agent, or Firm—Cushman, Darby & Cushman

[57] ABSTRACT

A spider-like carrier having at least three generally horizontal arms has a hub mounted to the vertical, rotary-axis input shaft of a load. Each arm has at least one horizontal cross-arm secured to it near its radially outer end, which is supported from the ground by a low-friction support device such as a wheel or set of wheels. Mounted on each arm at the cross-arm or cross-arms is at least one sail, vane, airfoil or similar working member which is erected or spread generally normally to the wind when the respective arm is located for the working member to be blown downwind and is feathered or headed to the wind when the respective arm is located for the working member to be driven upwind. Horizontal axis and vertical axis journalling options for the working members and various sail shapes are shown, including a concave/convex sail and motor-oriented airfoil shape which provides lift when being driven upwind are shown.

5 Claims, 18 Drawing Figures

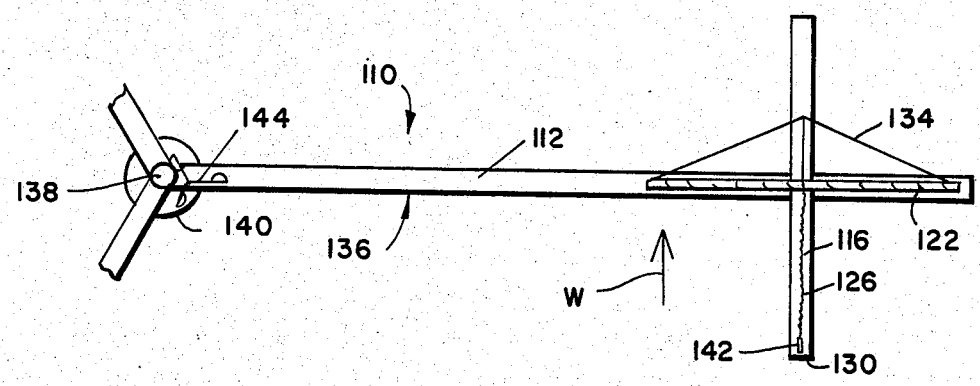
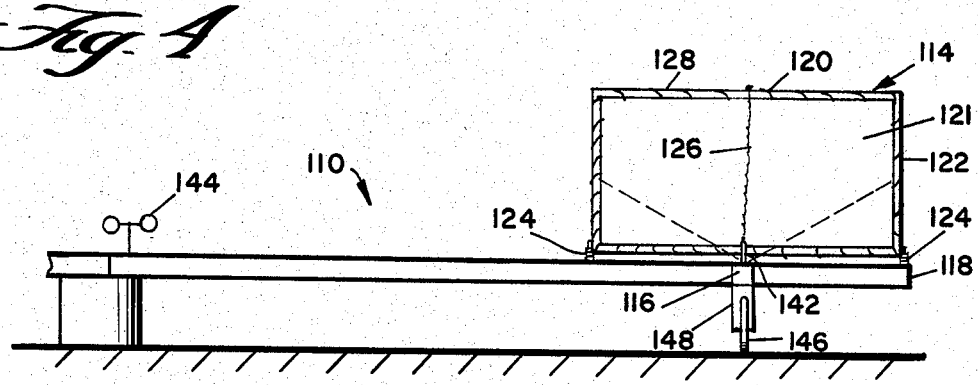
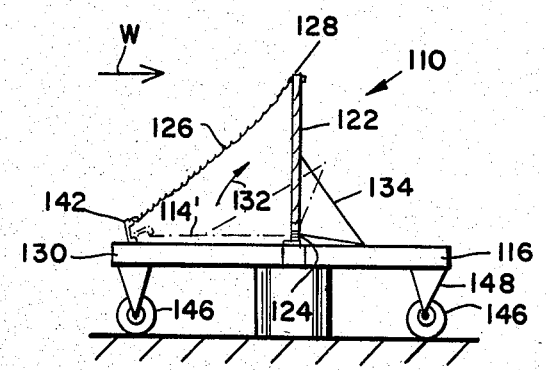

*Fig.* 9
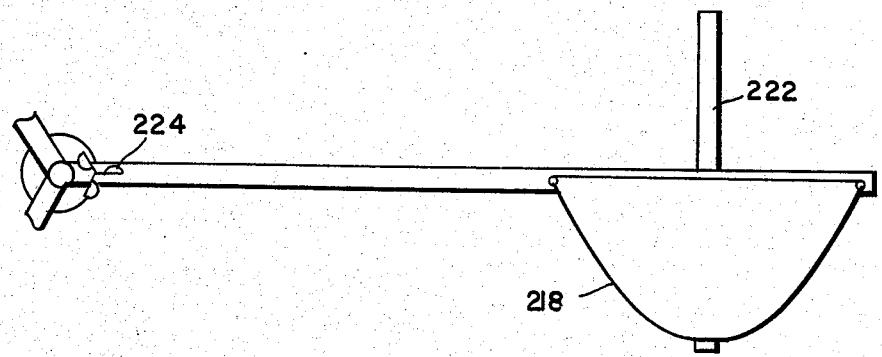
*Fig.* 10
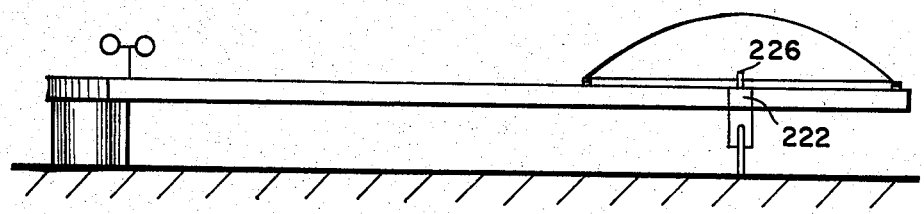
*Fig.* 11
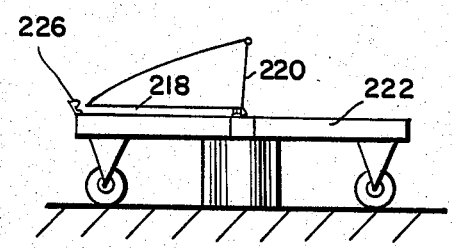

WIND MOTOR

BACKGROUND OF THE INVENTION

The present invention relates to wind motors and more particularly to a type of wind motor which has become designated by the U.S. Department of Energy as a "Wind Motor of the Predominantly Normal Force, Low Lift-To-Drag Ratio Type".

SUMMARY OF THE INVENTION

A spider-like carrier having at least three generally horizontal arms has a hub mounted to the vertical, rotary-axis input shaft of a load. Each arm has at least one horizontal cross-arm secured to it near its radially outer end, which is supported from the ground by a low-friction support device such as a wheel or set of wheels. Mounted on each arm at the cross-arm or cross-arms is at least one sail, vane, airfoil or similar working member which is erected or spread generally normally to the wind when the respective arm is located for the working member to be blown downwind and is feathered or headed to the wind when the respective arm is located for the working member to be driven upwind. Horizontal axis and vertical axis journalling options for the working members and various sail shapes are shown, including a concave/convex sail and a motor-oriented airfoil shape which provides lift when being driven upwind.

The principles of the invention wil be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

FIG. 3 is a fragmentary top plan view of a second embodiment of the wind motor;

FIG. 4 is a fragmentary side elevational view thereof; and

FIG. 5 is a fragmentary outer end elevational view thereof.

FIGS. 9–11 are comparable views showing th device of the third embodiment with the exemplary sail feathered.

DETAILED DESCRIPTION

Figure 1:
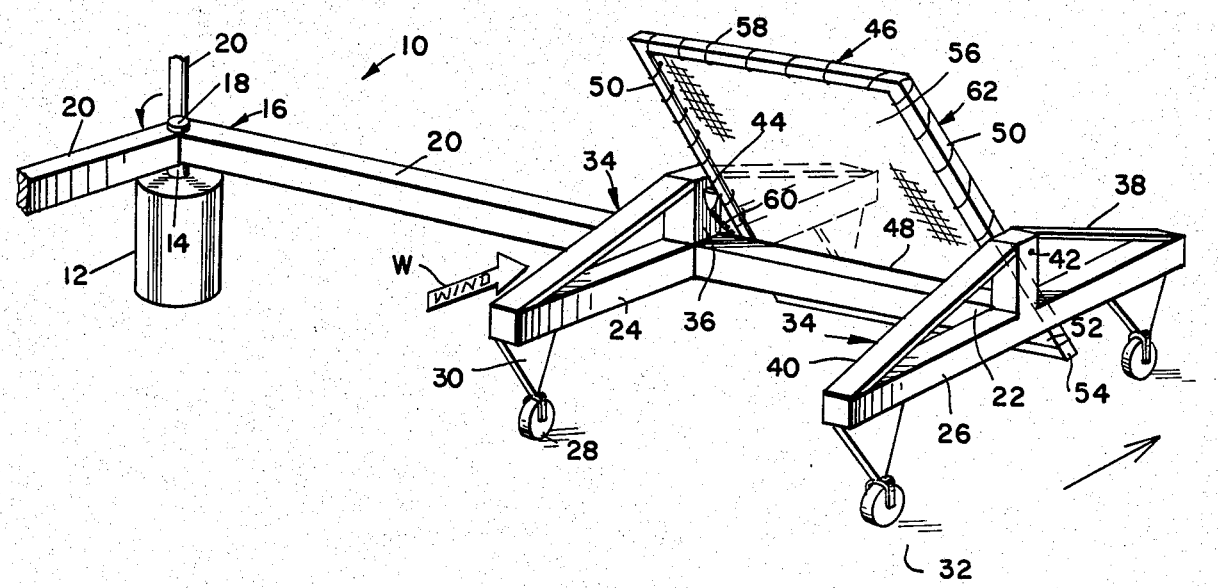
FIG. 1 is a fragmentary perspective view of a first embodiment of the wind motor, showing one sail being driven downwind.
Figure 2:
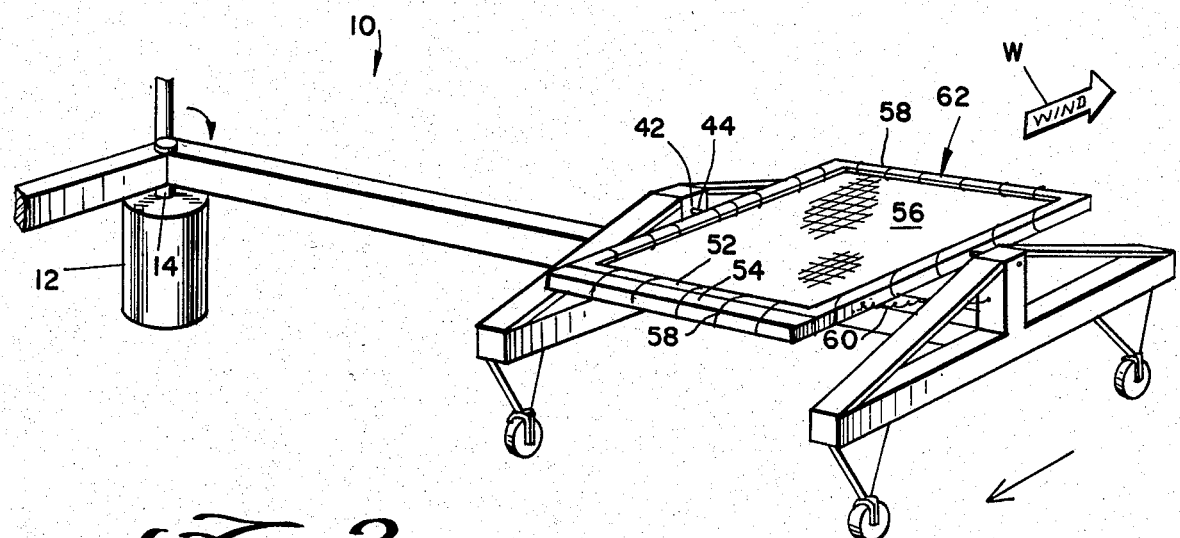
FIG. 2 is a fragmentary perspective view thereof, showing one sail being returned upwind in a feathered state.

A first embodiment of the wind motor is shown at 10 in FIGS. 1 and 2. The apparatus depicted is shown including a load 12, e.g. an electrical generator, having a vertical axis rotary input shaft 14, e.g. of its rotor (not shown). To the shaft 14 there is secured a spider, framework or carrier 16 having a hub 18 from which at least three equiangularly spaced arms 20 radiate generally horizontally. The structure on each arm 20 is the same, so only one is shown, for exemplification. Each arm 20 may be from several inches up to many feet long. Respectively near and at the radially outer end 22 of each arm 20, a cross-arm 24, 26 is fixed to the arm 20. Each cross-arm 24, 26 is generally horizontal and intersects the respective arm at a right angle. Accordingly, the cross-arms 24, 26 extend generally angularly of the axis of the shaft 14, although preferably they are straight elements, rather than arcuate ones.

The cross-arms 24, 26 are shown having depending carriage wheels 28, e.g. as trucks mounted thereto by pivot-carrying frames 30. Where the device 10 is to be used on water, the wheels 28 may be replaced by pontoons (not shown); and where the device 10 is to be used on ice, the wheels 28 may be replaced by runners such as those used on sleds or skates. In general, what is provided is a low friction, ground-engaging support means, the term "ground" here being used generically to equally designate land, a land-based platform, an ice platform, the surface of a body of water, and the like. Although the ground, as illustrated at 32 is simply a flat, upwardly-presented, horizontal, firm surface, the circular sites thereon on which the wheels 28 roll may be constituted by respective radially inner and radially outer tracks osr trackways, e.g. such as are used for railroad trains or for the domes of astronomical telescope housings.

The respective radially inner and radially outer cross-arms 24, 26 are shown having respective frames 34 securely built thereon so as to project upwardly therefrom, e.g. of generally triangular truss form of central vertical elements 36 and leading and trailing sloping elements 38, 40. Each frame 34 provides respective horizontal-axis bearings 42, which are coaxial with one another and are parallel to and superimposed upon the respective arm 20.

The bearings 42 journal the respective trunnions 44 of a frame 46 which is shown being of tubular rectangular form. The frame 46 generally spans the distance between the two cross-arm and frame units and is sufficiently long (in direction parallel to the length dimension of the cross-arms), that when fully erect (FIG. 1), the lower part of the frame 46 engages the angularly leading face 48 of the respective arm 20, but substantially clears the ground surface 32. Likewise, when fully erect, the upper part of the frame 46 projects substantially above the frames 34, the trunnions 44 being located, e.g. half-way along the side members 50 of the frame 46.

By preference, the lower member 52 of the frame 46 either is weighted, e.g. by being a tube filled with lead shot, and/or by having a relatively heavy bar 54 secured to it, so that the frame 46 is provided with a substantial tendency to assume and keep the erect condition which is shown in FIG. 1.

The frame 46 is shown having its enclosed area fully webbed by a sail 56, which, for instance, is hemmed about its periphery and provided with reinforced grommets through which lacing 58 is strung and twined spirally taut about frame elements much as the canvas floor of a boxing ring is stretched taut to the frame of the ring.

The structure 10 is completed by stop means, e.g. tenstile ties, shown in the form of two wires 60 each having one end secured to a respective side member 50 of the frame (e.g. midway between the respective trunnion and the lower member 52), and the respective side frame 34 (e.g. midway up the posts 36). The tensile ties 60 are made sufficiently long as to permit the framed sail 62 to be able to pivot from the generally vertical, deployed, erect condition shown in FIG. 1 to the generally horizontal, stowed, feathered condition shown in FIG. 2, but no further. In order to prevent the ties 60 from drooping too far when the framed sails are erect, the ties 60 may be provided as resiliently coiled elements such as tension coil springs or, such as the familiar coiled electrical cord which conventionally extends between a telephone handset and base.

Nothing need be made of peculiar material, the choice of materials being based on standard considerations of durability, weight, availability of particular machining means, and the like. Stainless steel tubing and sail canvas are typical constructional materials which may be used, as are wood and rip-stop nylon sailcloth.

Accordingly, when the apparatus of FIGS. 1 and 2 is constructed and arranged as shown, as the wind blows, the framed sail which is most nearly situated to catch the wind is fully erected (FIG. 1), due to the action of the weight 54, which at least partly erects the framed sail, possibly combined with the net force of the wind. (The wind force may be more effective against the upper half than the lower half of the sail due to its distance above the ground and its freedom from partial confinement by the side frames and undercarriage of the respective carrier of the device 10.) The wind, acting in the direction of the arrow W, forces the carrier 16 to rotate, so that the shaft 14 of the load 12 is turned by the hub 18 of the carrier 16. As the carrier 16 rotates an angularly trailing one of the at least three framed sails is brought towards and through the working position shown in FIG. 1, and the framed sail that was in the FIG. 1 position is advanced towards and through the diametrically opposite position shown in FIG. 2. Although the means 54 must be such as will bias the respective framed sail towards an erect condition, it must not be so heavy as to prevent the force of the wind from automatically feathering the respective framed sail as the respective framed sail is brought up-wind (FIG. 2). The amount of weight needed is best determined empirically at the site of the particular installation. To protect the major portion of the device 10 in a gale or other excessive wind condition, the device 10 may be designed so that the lacing and/or the sails will tear, blow out, come loose or the like, for repair, replacement or reassembling after normal wind conditions have resumed.

A second embodiment of the invention is shown at 110 in FIGS. 3-5. This embodiment may be more economically constructed and yet will be sufficiently rugged in many instances. In this embodiment, in general, on each of the three or more arms 112, the framed sail 114 is centered over a respective single cross-arm 116, rather than being journalled between two cross-arms with an attendant savings in structure.

As shown in FIGS. 3-5, each cross-arm 116 is secured crosswise on the respective arm 112 at a site which is located near but not at the radially outer end 118 of that arm.

Each framed sail 114 is shown being constituted by a generally rectangular frame 120, e.g. made of metal tubing, having a sheet-like sail 121, e.g. of canvas or sailcloth stretched taut across the framed area by lacing 122. The framed sail is shown mounted on the arm by spring hinges 124 which tend to keep the framed sail erected as shown. When erect, the framed sail projects upwardly from the respective arm generally vertically and in a plane containing that arm.

A tensile tie wire 126 connects between the center of top member 128 of the frame and the angularly trailing end 130 of the cross-arm 116. The tensile tie wire 126 is sufficiently long to permit the framed sail to rotate in the direction of the arrow 132 from the generally horizontal flat, feathered position shown at 114' in dashed lines, to the full line, erect position, but no further, i.e. to act as a stop. This stop function may be supplemented by a standard bracket 134 which is mounted to the angularly leading side of the frame 120 and arranged to bear on the cross member as shown when the framed sail is erect, much as a conventional stand-up picture frame is supported by the standard which angles down obliquely from its back.

As with the first embodiment, as the wind blows in the direction indicated by the vector W, the framed sail most nearly having the indicated relative position has an erect condition as shown and thus is driven by the wind, causing the carrier 136 to rotate, rotating the vertically oriented input shaft 138 of the load 140. As the arm carrying that framed sail is swept around to where that framed sail is being driven upwind, the framed sail is temporarily blowndown by the wind to its lowered, generally horizontal feathered condition, which causes mechanical energy for reerection of that framed sail to be stored in the spring hinges 124. Tilting down of each framed sail 114 is limited by abutment of the center of the top member 128 of the frame 120 with the cross-arm 116.

As with the first embodiment, the tensile tie wire 126 may be self-coiling so as to take up the slack without excessive drooping as the respective framed sail is temporarily feathered.

The spring hinges 124 may be replaced by simple hinges where the weight and position of the standard bracket 134 approximately counterbalances the respective framed sail about the hinge axis when the framed sail is in its feathered condition.

In this second embodiment, as well as in the first, the wind motor may accommodate excessive wind by blow-out or ripping of the sails and/or sail-to-frame lacing, or a latch means 142 may be provided for coming into use only when the wind is blowing with excessive force. For instance, an anemometer 144 may be provided which provides a signal to a solenoid-operated latch means 142 when the wind blows too hard. Accordingly, for the period when the wind is blowing too hard, as each framed sail is first feathered while being rotated up-wind, the activated latch 142 catches its frame top member 128 and holds it down. In short order, all the framed sails thus are locked in a feathered condition for the duration of the excessively windy condition, whereupon the anemometer terminates activation of the latches 142 and the framed sails again become free to be erected.

Although the arm 112 is shown supported by two ground-engaging wheels 146, one located fore and one located aft on brackets 148 on the underside of the single cross-arm 116, more or less wheels or other low friction supporting elements could be provided on each cross arm 116 and/or each arm 112 near the cross-arms.

Figure 6:
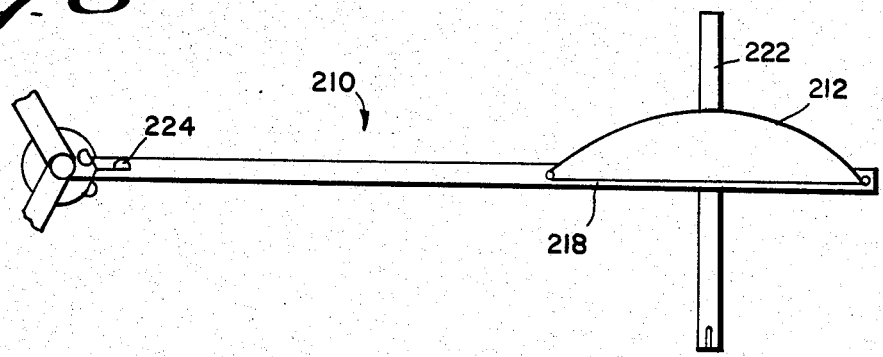
FIGS. 6–8 are similar views, respectively, of a third embodiment.
Figure 7:
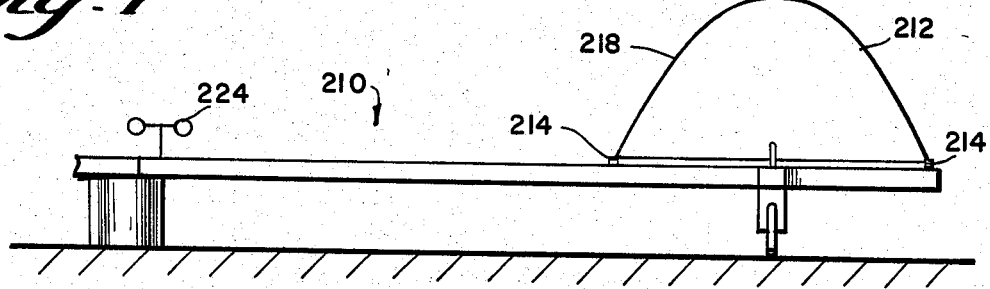
Figure 8:
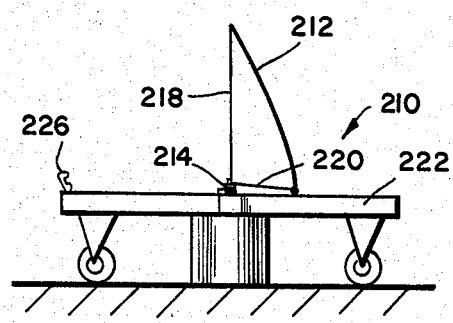

A third embodiment of the wind motor is illustrated at 210 in FIGS. 6-11. In FIGS. 6-8, its exemplary sail 212 is shown in an erect condition and in FIGS. 9-11, its exemplary sail 212 is shown in its feathered condition.

In this embodiment each sail 212 is formed so as to have a curved vane shape, e.g. as a quarter of a prolate spheroid shell which is concave toward the wind when erect, convex toward the wind when feathered and pivotally mounted at 214 so that it presents a substantially greater facial area normal to the wind when erect (FIGS. 6-8) than when feathered (FIGS. 9-11). The sails 212 may be made of framed, stayed, guyed and/or sized fabric, so that it is held by supplementary means in its desired shape, much as lightweight dome-shaped tents used by back-packers are held curved by bowed fiberglass poles mounted on tubular battens, or the sails 212 may be self-framing in the sense of being constituted by bent or molded elements, e.g. made of sheet metal or fiber-reinforced plastic.

Accordingly, each sail has one longer/taller arch-like edge 218 which angularly trails and is generally vertically oriented when the sail is erect, and, disposed in a plane that extends at about a right angle to the plane of the edge 218, an opposite shorter arch-like edge 220 which angularly leads and is generally vertically oriented when the sail is feathered. Abutment of the edge 220 with the cross arm 222 provides a stop for defining the erect position of the sail 212 and abutment of the edge 218 with the cross-arm 222 provides a stop for defining the feathered position of the sail 212.

The base edge 220 may be weighted as in the first embodiment to ensure expeditious erection, and/or the pivotal connection at 214 may be made by means of spring hinges as with the second embodiment, to the same effect.

An anemometer-operated latching system is illustrated at 224, 226 and operates for this embodiment much as does the comparable structures of the second embodiment as described above.

The remainder of the arms, cross arms, wheels or the like and load may be as described for the second and/or first embodiment.

A fourth embodiment of the wind motor 410 is now described with reference to FIGS. 12-18. In this embodiment, a carrier 412 much like that of any of the foregoing three embodiments is similarly drivingly connected at its hub 414 to the vertical, rotary input shaft 416 of a load 418. The carrier 412 has at least three equiangularly spaced, horizontally radiating arms 420, each having at least one cross-arm 422 that is supported from the ground by one or more low-friction ground-engaging support means such as wheels 448 journalled for horizontal axis rotation. Preferably there are two such wheels 448, one located angularly before and the other located angularly behind the respective arm at a common radial distance from the hub 414.

What is different about the fourth embodiment is that each framed sail, sail, vane or other working member on each arm, instead of being mounted to rotate up to an erect condition and down to a feathered condition about a substantially horizontal axis that is generally parallel to a radius of the carrier, is mounted to rotate about a substantially vertical axis and to have an airfoil transverse cross-sectional shape so as to create lift while being driven upwind. Accordingly, in this version, the device 410 is a combination lift and drag wind motor instead of substantially only a drag-type wind motor. However, this embodiment may use the same three-or-more armed carrier 412 as described hereinbefore, having its hub 414 secured in driving relation to the input shaft 416 of a load 418.

Figure 12:
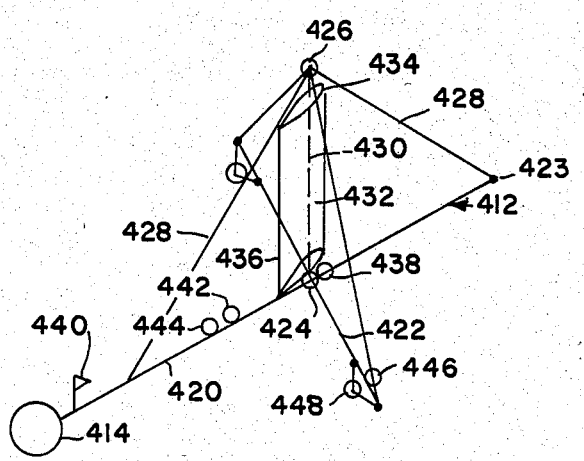
FIGS. 12, 13, 14 and 15 are schematic diagrams of a fourth embodiment of the wind motor.

FIG. 12 is a highly diagrammatic view for introducing the concept of the fourth embodiment. Here the carrier 412 is represented by one of its three arms 420, this arm being shown provided with a single horizontal cross-arm 422 located near but not at the radially outer end 423 of the arm 420. At the junction of the arm 420 and cross-arm 422 a lower bearing 424 is provided; it has a vertical axis. Juxtaposed vertically above the lower bearing 424, on the same axis is an upper bearing 426 which is provided in a bearing block that is mounted in place, e.g. by guy wires 428 secured between it and various sites distributed about the respective arm, cross-arm and carrier, e.g. as shown. A mast 430 is vertically disposed and mounted between the lower and upper bearings 424, 426 for rotation about its own longitudinal axis. The sail, vane or working member 432 is provided in the form of an airfoil having a blunter leading edge 434 than trailing edge 436, e.g. an elongated tear-drop transverse cross-sectional shape. The working member 432 is vertically oriented and mounted on the mast 430 so that the mast passes coincidentally along the aerodynamic centerline of the airfoil. The airfoil extends nearly to the top and bottom of the mast, so that stubs of the mast project downwards and upwards from the airfoil to serve as trunnions in the bearings 424, 426.

A motor 438, e.g. an electric motor is mounted on the arm 420 and drivingly connected to the mast 430, e.g. by an endless drive belt entrained about respective pulleys, or by a gearhead meshed with a sprocket on the arm 420 (not illustrated in detail), so that reversible operation of the motor 438 changes the angle of the airfoil about the axis of the mast 430, e.g. for maintaining an angle of attack α to the wind. Accordingly, the motor 438 may be operated to maximize lift as the respective airfoil is being driven up-wind, and to open the airfoil perpendicular to the wind when the respective arm is oriented to have the airfoil thereon driven downwind.

In this embodiment, a wind vane 440 is provided, e.g. on the carrier, for measuring the direction of the wind with respect to the particular arm 420, and to provide a signal proportional to the sensed direction to a conventional motor controller 442. The latter is conventionally connected to the motor 438 for reversibly operating the motor for properly orienting the respective airfoil to maintain the optimum angle α. The motor 438 may be powered by a battery 444 which may be arranged to be charged by an auxiliary generator 446 that is driven by rotation of one of the carriage wheels 448.

Figure 13:
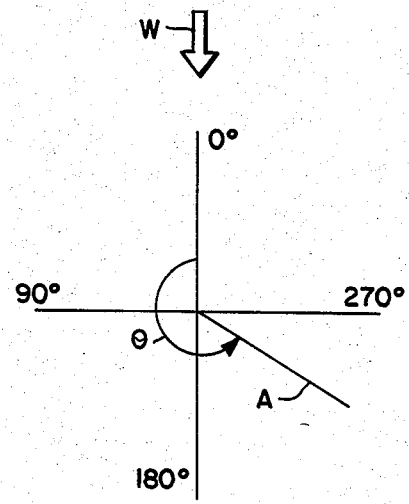
Figure 14:
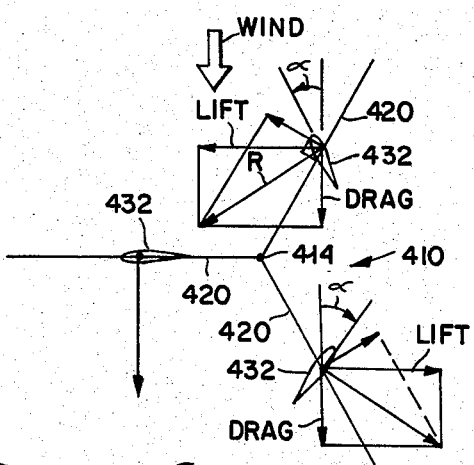

When the angle θ, being the angle from the wind direction to the lengthwise, i.e. radially directed axis of the arm 420 measured counterclockwise as shown in FIG. 13 is 270°, the motor 438 operates to shift the airfoil so that lift tends to cause the carrier of the wind motor to rotate counterclockwise. Referring to FIG. 14, the resultant R of lift and drag has a component perpendicular to the arm axis tending to rotate the arm counterclockwise about the load. This component of R perpendicular to the arm must contribute significantly to the torque driving the load and thus to the output of this embodiment of the wind motor in order to justify the expense of the vane control system including the motor, the motor controller, the wind vane and so forth.

Figure 15:
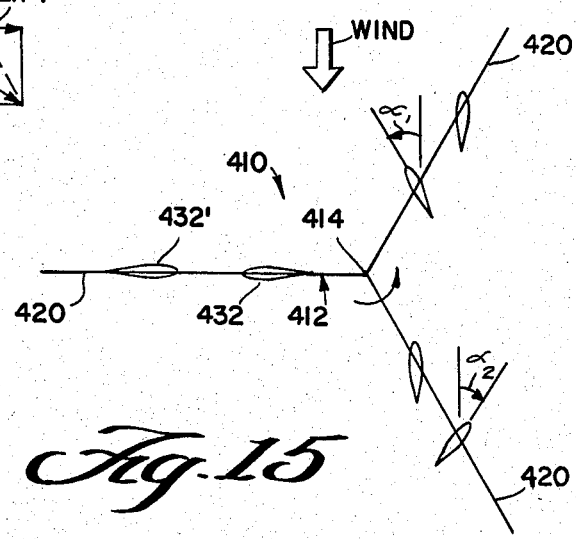
Figure 16:
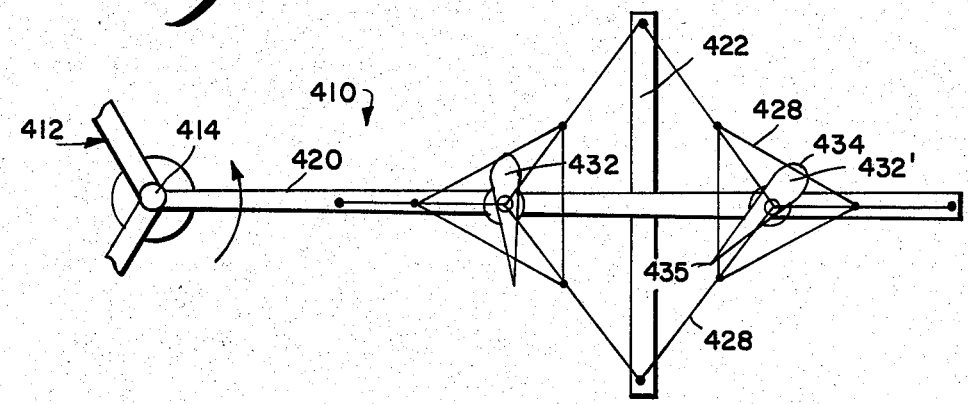
FIG. 16 is a fragmentary top plan view thereof.
Figure 17:
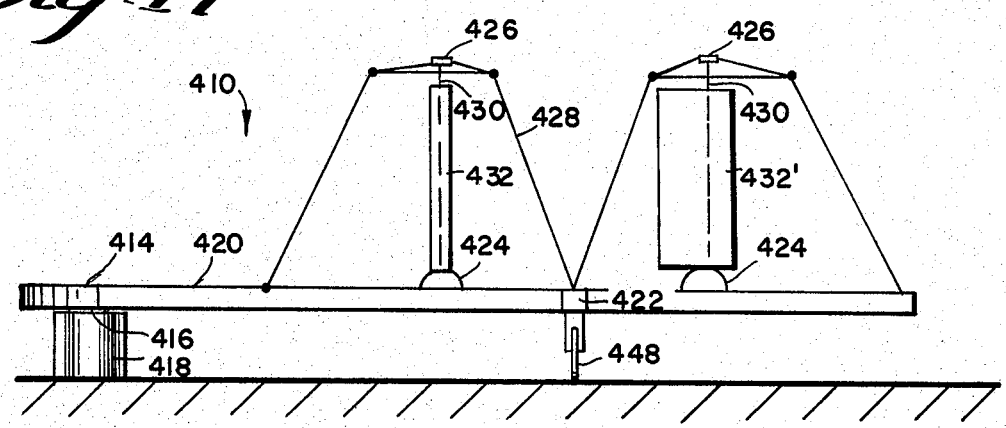
FIG. 17 is a fragmentary side elevational view thereof.
Figure 18:
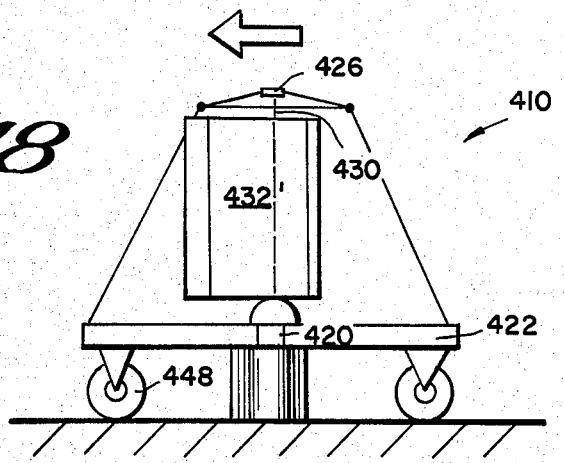
FIG. 18 is a fragmentary outer end elevational view thereof.

With reference to FIG. 14, the preferred transverse cross-sectional shape for each of the airfoil-type of working member 432 for this embodiment is a biconvex shape which is symmetrical about its chord and has a zero camber, since it must be driven to an optimum angle α on each side of the wind. However, as shown in FIG. 15 (and FIGS. 16–18), if two vanes 432, 432' are similarly provided on each arm, with radial spacing between them, an airfoil design with camber (planar-convex, concave-convex, or other) may be used for increasing lift, increasing torque, increasing power output and decreasing cost per unit of power provided by the wind motor 410. In this version, where the angle θ is 0–180°, the angles α for the radially inboard and outboard vanes 432, 432' may be 90°; for θ=180°–270°, α for 432 is 0° and α for 432' is an empirically optimum angle; and for =270°–360°, α for 432 is an empirically optimum angle and α for 432' is 0°, with smooth transitions from position to position throughout rotation of the carrier 412.

FIGS. 15–18 show the embodiment of FIG. 14 in the same style and degree of detail as is provided for the third embodiment in FIGS. 6–11.

It should now be apparent that the wind motor as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A wind motor for relatively powering a load which has a vertically-oriented rotary input shaft, comprising:
   a carrier having at least three radially projecting, generally horizontal arms mounted to a central hub which is constructed and arranged to be operatively mounted to the rotary input shaft of the load;
   each arm having a generally horizontal cross-arm mounted thereto radially remote from said hub;
   low friction ground support means for each arm mounted to at least one of that arm and its at least one cross-arm;
   for each arm, at least one working member in the form of a vane and frame means mounted to the respective at least one cross-arm and providing bearing means journalling the respective vane for rotation between an erect position wherein the vane is disposed to be blown downwind to maximally impart rotary force to the carrier, and a feathered position wherein the vane is disposed to be driven upwind with minimal detraction of rotary force from the carrier
   said cross-arm on each arm being disposed with radial spacing from the radially outer end of the respective arm;
   the bearing means comprising hinge means mounted on each vane along a lower edge thereof radially inboard and outboard of the respective cross-arm;
   the feathered position of each vane being defined by abutment with the respective cross-arm; and
   each vane being constituted by a shell having a concave side and a convex side, the concave side being oriented toward the wind when the vane is in its erect position and the convex side being oriented toward the wind when the vane is in its feathered position.

2. The wind motor of claim 1, further including:
   a latch means provided on each cross-arm for latching each vane in the feathered position thereof;
   a wind speed sensing means; and
   control means operatively connected between said wind speed sensing means and each said latch means for activating said latch means only when the sensed wind speed exceeds a selected maximum.

3. The wind motor of claim 1, wherein:
   the hinge means is constituted by spring hinges biased to tend to erect the respective vanes.

4. The wind motor of claim 1, wherein:
   each said shell is shaped as a quarter of a prolate spheroid oriented so as to be taller when erect than when feathered.

5. The wind motor of claim 4, wherein:
   the erect position of each vane is defined by abutment of an edge of the respective vane with the respective cross-arm.

* * * * *